Nov. 23, 1948.   C. G. KIRKBRIDE ET AL   2,454,605
DESALTING CRUDE OIL
Filed Oct. 4, 1945   2 Sheets-Sheet 2
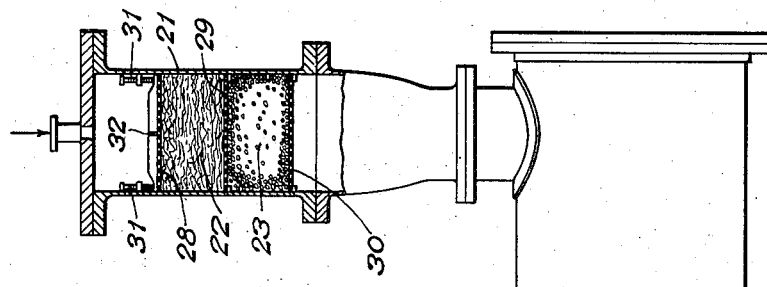
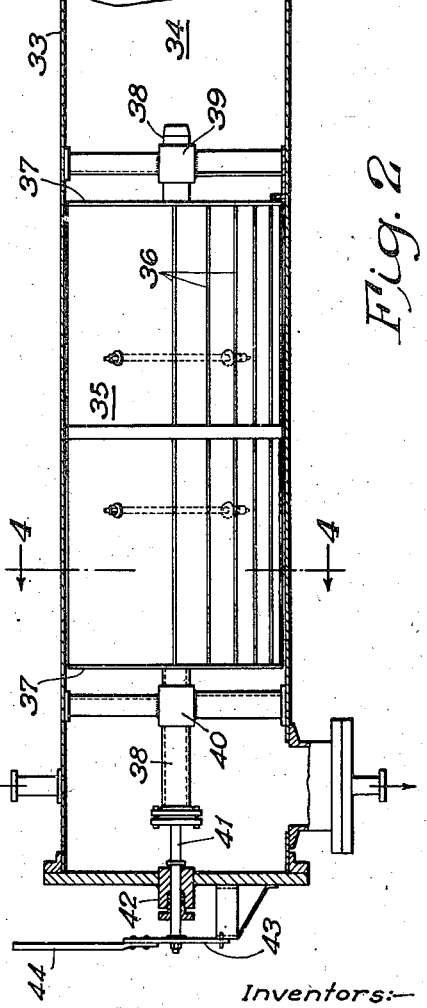
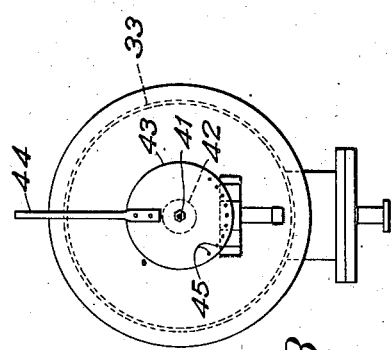
Inventors:—
Chalmer G. Kirkbride
Mark C. Hopkins
By Arthur H. Bransky
Attorneys Patented Nov. 23, 1948

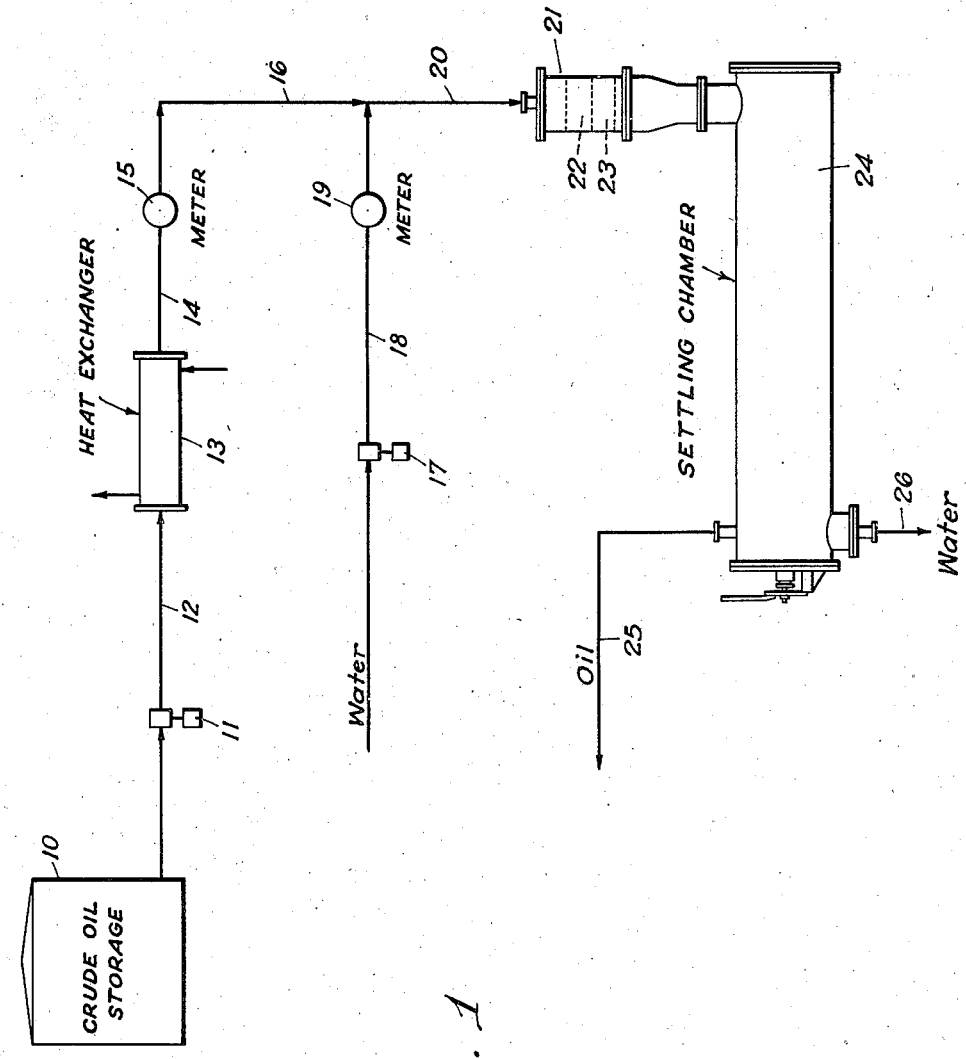

2,454,605

UNITED STATES PATENT OFFICE 2,454,605

DESALTING CRUDE OIL

Chalmer G. Kirkbride, College Station, and Mark C. Hopkins, Texas City, Tex., assignors to Pan American Refining Corporation, New York, N. Y., a corporation of Delaware Application October 4, 1945, Serial No. 620,342

9 Claims. (Cl. 252—324)

This invention relates to improvements in the desalting of salt-containing oleaginous liquids and more particularly relates to the desalting of hydrocarbon crude oils and/or the resolution of crude oil-salt water emulsions.

The resolution of crude oil-salt water emulsions and the desalting of crude oils has long been an important problem in the production of petroleum. Generally, oil sands produce, along with the crude oil and natural gases, quantities of water varying from a trace to 50% or more. This water is generally emulsified in the oil to varying degrees and may range from a practically fresh non-saline water to brine solution almost saturated with inorganic salts, especially chlorides of sodium, calcium and magnesium. Since the salt content in most crude oils is present as highly dispersed brine, the emulsions formed are in general of the water-in-oil type. These emulsions are stabilized both by the fine degree of dispersion of the salt droplets and also by the presence of natural occurring stabilizing or emulsifying agents which are present in the crude oils, for example, naphthenic and/or asphaltic compounds, fatty acids, etc. The stability of such emulsions may be further enhanced by suspended clay particles.

Aside from the losses incurred by the production and transportation of such salt-containing crudes, the presence of these salts in refinery charging stocks causes serious operating difficulties, such as excessive depositions which interfere with heat exchange, corrosion and the like.

It is an object of the present invention to provide a method of desalting oleaginous liquids and/or resolving emulsions of oleaginous liquids and salt water. Another object of the invention is to provide a method of desalting crude petroleum oil. Another object of the invention is to provide a method of resolving emulsions of crude oil and salt water.

Other objects and advantages of the invention will become apparent from the following description thereof read in conjunction with the accompanying drawings in which Figure 1 is a diagrammatic flow diagram of a preferred embodiment of the invention.

Figure 2 is a sectional elevation of one form of filter bed and settler used in carrying out the process of the invention.

Figure 3 is a front elevation of the settler shown in Figure 2; and

Figure 4 is a section taken on the line 4—4 of Figure 2.

In accordance with the present invention, oleaginous liquids particularly crude petroleum oil can be effectively desalted, and emulsions of such liquids with salt water can be resolved by passing such liquids through a compressed bed of fiber glass. The bed of fiber glass may be in the form of a single mass of fiber glass or may take the form of multiple relatively thin beds of the fiber glass. Although not essential, it is preferable that passage of the liquid through the bed of fiber glass be followed by passage through a bed of gravel or sand or the equivalent, such as for example, a layer 16-30 mesh sand supported on a bed of one-eighth to one-quarter inch gravel.

For the most effective results the fiber glass bed should have a density of from about 10 pounds to about 20 pounds per cubic foot and an interfiber distance, based on such bed densities, of from about 0.0042 inch to about 0.0084 inch. An exposed fiber area of from about 2.2 to about 4.4 square feet per gallon of oil treated per hour is desired for optimum effectiveness. These factors are obtained when using a fiber with a diameter of .00028 inch. Suitable fiber glass for the herein-described purpose is the fiber glass marketed by the Owens-Corning Fiberglas Corporation, although it is to be understood that any fiber glass having the desired properties above described can be employed. By way of example, the following products marketed by the Owens-Corning Fiberglas Corporation or even smaller fibers are suitable,

| Fiber No. | Average Fiber Diameter, Inches |
|---|---|
| 55 | 0.00055 |
| 40 | 0.00040 |
| 22 | 0.00022 |

It is important that the glass wool be compressed sufficiently to form a firm mass in order to anchor the fibers and prevent channeling through the bed due to shifting of the fibers. In compressing the bed it will be found that the initial compression is rather elastic and uniform until a density of about 9 pounds/cu. ft. is reached. Thereafter, the bed becomes relatively incompressible unless special provisions are made to permit further compression. The compression can be satisfactorily accomplished with the aid of bolted members arranged to act on a relatively rigid perforated plate. In general, compression must be carried sufficiently beyond the point of apparent incompressibility so that the final density will be increased by at least 10% and preferably by 25%. It will be evident that sufficient compression is not attainable by ordinary means, such as tamping or by compression between relatively flexible members.

As alluded to above, it is advantageous to provide a gravel or sand bed following the bed of fiber glass. The sand or gravel used in such bed should be of relatively coarse grain, such materials of from 16 to 60 and 4 to 8 mesh having been found suitable.

Before the salt-containing oil is passed through the fiber glass bed, it is preferable to introduce into the salt-containing oil from about 2% to about 25% and preferably from about 5% to about 10% of fresh water, and to heat the mixture to a temperature of from about 150° F. to about 300° F. and preferably from about 200° F. to about 250° F. While the feed rate to the filter can be varied within wide limits, it has been found that for fiber glass filter beds having the above described characteristics, the feed rate to such beds should not exceed about 1200 barrels per day per cubic foot of compressed fiber glass, and is suitably within the range of from about 100 to about 750 barrels per day per square foot and preferably from about 250 to about 400 barrels per day per square foot when the total thickness of the bed is 1½ to 5 inches.

After the salt-containing oil is passed through the filter bed, the oil and water is introduced into a settler drum which is suitably provided with a non-baffle zone and a baffle zone. The baffle zone can be provided with longitudinal baffles mounted in a frame on a shaft so that the plane of the baffle plates can be varied from the horizontal to the vertical by rotating the shaft, thus permitting variations in the settling distance at constant retention times. The retention time in the settler can be varied over a wide range, although retention times of from about 2 minutes to about 20 minutes or more are suitable, depending on the settling distance.

An application of the present invention is given by the following description which is given by way of illustration only and is not intended to be a limitation to the scope of the invention. Referring to Figure 1, a salt-containing crude oil from a storage tank 10 is pumped via a pump 11 and line 12 through a preheater 13 wherein the crude oil is heated to a temperature of about 250° F. From the preheater, the heated oil is passed through line 14 through an oil meter 15 and into the line 16 where it is mixed with water introduced via pump 17 and line 18. Line 18 is provided with a water meter 19. The amount of water introduced into line 17 is so regulated as to introduce about 10% of fresh water into the charged line. The mixture of crude oil and water is introduced via line 20 into the top of a filter cell 21 provided with a fiber glass bed 22, superimposed upon a gravel bed 23. If desired, an orifice mixer designed for a pressure drop of 10 to 50 pounds may be advantageously interposed in line 20. After passing through the filter cell the mixture of crude oil and water is introduced into a settling chamber 24, provided with a baffle zone as herein-described, wherein stratification of the water and desalted crude oil takes place. The desalted crude oil is removed from the settler 24 through line 25, while the water is removed from the settler through line 26.

A suitable filter cell and settling chamber well adapted for the herein-described purpose is shown in detail in Figures 2, 3 and 4. Referring to Figure 2, the filter cell 21 is equipped with three perforated plates 28, 29 and 30, providing fiber glass bed 22 and a gravel bed 23. The perforated plates 29 and 30 are fixed in the cell 21 while the perforated plate 28 rests upon the fiber glass bed. By means of screw bolts 31, which act against holding means 32, pressure on the perforated plate 28 can be regulated to give the desired density to the fiber glass bed. The settling chamber 24 comprises a horizontal shell 33 divided into an unbaffled zone 34 and a baffle zone 35. The baffle settling zone is equipped with horizontal baffles 36 mounted in a frame 37 supported on a shaft 38 passing through bearings 39 and 40. The shaft 38 is coupled with an arm 41 which extends to the exterior of the shell 33 through a stuffing box 42. The free end of the arm 41 is attached to a disc 43 which is provided with a lever 44 to facilitate the rotation of the baffle frame 37. The baffles 36 can be adjusted to the desired position by rotating the shaft 38 by means of lever 44 and fixing the baffles in the desired position by suitable securing means, such as by inserting a pin into one of the openings 45 (Figure 3) in the bottom portion of plate 43. By rotating the baffle frame, the plane of the baffle plates can be varied from the horizontal to the vertical, thus permitting variation of the settling distance at a constant retention time.

The crude oil desalting efficiency of fiber glass having the herein-described characteristics is illustrated by data in the following data:

*Table I*

| Run No. | Duration, Hrs. | Contact Bed ||||| Oil B per sq. ft. per D | Average Press. Drop Across Bed, lbs. per sq. in. | Settler Press., lbs. per sq. in. | Temp. °F. || Salt Content |||
|---|---|---|---|---|---|---|---|---|---|---|---|---|---|
| | | Filtering Material | Amt., lbs. | Depth, In. | Density, lbs. per cu. ft. | | | | To Bed | From Settler | Charge, Gm. per Bbl. | Treat., Gm. per Bbl. | Removed, Per Cent |
| 1 | 32 | Fiberglass | 12.5 | 5 | 14.2 | 266 | 23 | 25 | 202 | 190 | 24.0 | Trace | 100 |
| | 16 | ...do... | 12.5 | 5 | 14.2 | 320 | 30 | 25 | 200 | 187 | 21.2 | Trace | 100 |
| | 10 | ...do... | 12.5 | 5 | 14.2 | 390 | 39 | 30 | 202 | 190 | 21.2 | Trace | 100 |
| | 15 | ...do... | 12.5 | 5 | 14.2 | 440 | 50 | 35 | 200 | 188 | 21.2 | Trace | 100 |
| | 35 | ...do... | 12.5 | 5 | 14.2 | 496 | 68 | 35 | 205 | 192 | 21.2 | Trace | 100 |
| 2 | 5 | ...do... | 6.25 | 2.5 | 14.8 | 266 | 10 | 35 | 206 | 190 | 27.2 | Trace | 100 |
| | 5 | ...do... | 6.25 | 2.5 | 14.8 | 496 | 24 | 35 | 204 | 192 | 27.2 | 0.3 | 99 |
| | 9 | ...do... | 3.75 | 1.5 | 14.8 | 266 | 12 | 35 | 204 | 190 | 27.2 | 1.5 | 94.5 |
| | 4 | ...do... | 3.75 | 1.5 | 14.8 | 496 | 20 | 35 | 200 | 188 | 27.2 | 8.7 | 68.0 |
| 3 | 255 | Fiberglass. Sand. | 4 225 | 3 7 | ---------- | 370 | 54 | 35 | 200 | 190 | 38.0 | 6.3 | 83.5 |
| 4 | 16 | Sand | 475 | 15 | ---------- | 266 | 10 | 25 | 205 | 190 | 17.5 | 13.6 | 22.0 |
| | 5 | ...do... | 475 | 15 | ---------- | 496 | 10 | 25 | 206 | 196 | 18.2 | 14.2 | 22.0 |
| | 2 | ...do... | 475 | 15 | ---------- | 710 | 10 | 25 | 204 | 194 | 18.2 | 16.0 | 12.0 |

Run No. 1 was of 108 hours duration. The bed consisting of 12½ pounds of Pyrex No. 719 fiber glass, packed in five individually supported one inch layers. The average diameter of Pyrex No. 719 fiber glass is within the range of from about 0.0002 to 0.0003 inch with an average diameter of .00028 inch. As shown by the data in the above table, practically 100% salt removal was obtained with a very gradual increase in pressure drop across the bed. Almost complete water separation was obtained with a retention time as low as 6.3 minutes with water settling rates as high as 2.55 inches per minute being obtained.

Run No. 2, which was of 23 hours duration, was made to compare the degree of desalting obtainable with varying amounts of fiber glass. Using first five one-half inch beds of Pyrex No. 719 fiber glass, complete desalting was obtained at 266 and 496 barrels of oil per square foot per day. The two top layers were then removed leaving three one-half inch layers. Under these conditions 94.5% and 68% salt removal was obtained at 266 and 496 barrels per square foot per day, respectively.

Run No. 3 was made with a combination of a fiber glass bed and a sand bed. This bed was built up of alternate layers of sand and fiber glass in which a seven inch layer of sand was covered with a three inch layer of fiber glass. The complete bed was about 10 inches deep and contained 225 pounds of sand and 4 pounds of fiber glass. This run was of 255 hours duration at a constant rate of 370 barrels of crude oil per square foot per day. For the first 170 hours the pressure drop across the bed rose from 40 to 50 pounds per square inch; from 170 hours to 200 hours the pressure drop increased 56 pounds, and at 255 hours the pressure drop rose to 86 pounds per square inch. As shown by the data, good salt removal was obtained.

Run No. 4 was made on a filter bed consisting completely of sand. As shown by the data in the above table, very poor salt removal was obtained.

Referring to run No. 2 it will be noted that the degree of salt removal is dependent on the filter rate at a given total bed thickness. In general, it is contemplated that a total bed depth of at least 1½″ be used when filtering at a rate of 300 b./d. per sq. ft. When thicker or thinner beds are used the filter rate may be increased or decreased proportionately. For example, when using a bed ½″ thick, a filter rate of about 100 b./d. per sq. ft. will be satisfactory for efficient salt removal.

Although multiple beds of glass wool have been cited in runs No. 1 and No. 2, a single bed may be used, particularly when the amount of solids present and consequently the rate of pressure drop increase, is very small. When solids are present, the single bed is subject to disintegration due to the fact that the lower part of the bed must support the entire drop in pressure. By using multiple beds, the pressure drop is divided between the beds and a much higher total final pressure drop can be tolerated before disintegration occurs. Another advantage of the multiple bed arrangement resides in the ability to replace the initial beds without disturbing the latter beds when undesirable pressure drop has developed. When multiple beds are used, they should be independently compressed and supported.

With multiple beds, the glass fiber size may be graded to permit operation for a longer period of time before excessive pressure drop is developed. For example, the first bed may be made of fiber glass having an average fiber diameter of about 0.00055 inch, the second bed of fiber having an average diameter of about 0.00040 inch, and succeeding beds of fiber having an average diameter of about 0.00022 inch or even finer fibers. In general fiber having an average diameter of about 0.00040 inch or smaller is preferred in making up the beds. In this manner, the greater interstitial distance between fibers in the first bed will permit accumulation of a greater amount of solids or will collect the larger sized solids and thereby prevent plugging of the beds of finer fiber size. In some cases it may be desirable to pass the emulsions first through a sand bed arranged to permit backwashing in order to remove the bulk of the solid matter, and thereby prolong the life of the glass-fiber filter. Many alternate arrangements will be evident to those skilled in the art.

Where crude oils are encountered which contain natural-occurring stabilizing agents, the added water may be acidified or causticized slightly in order to control the pH of the brine to destabilize the emulsion. Certain soaps may also be used as destabilizing agents to facilitate the desalting process.

Basically, passage of the water-in-oil emulsion through the fiber glass causes the exceedingly small water and brine droplets to coalesce into relatively large drops which separate readily. Inasmuch as glass is a silicious material, it is preferentially wetted by the aqueous phase and thereby is able to collect aqueous droplets until they become large enough to be either swept away by the moving oil stream in relatively large-sized drops or to fall from the wetted mass. In this process the interfiber distance plays an important role in assuring the contact between a droplet and a glass fiber. Although decreased interfiber distances may be used when employing finer fibers with extreme compression of the bed, effective desalting can be obtained, within limits, by using relatively coarser fiber and increasing the depth of the bed. In addition to the preferential wetting power of the glass fibers, there is the possibility that the motion of the fluids past the glass fibers generates an electric charge on the droplets which facilitates coalescence. While the exact reasons for the effectiveness of the compressed glass wool fibers is not known precisely, it is believed that all the aforementioned factors play some part in this process.

The type of filter used may be similar to that shown or may be constructed as a separate unit. For example, two filters may be made similar to the Kelly Type multiple leaf filter, and arranged to permit the use of one filter while the other is being backwashed or recharged with fresh glass wool fibers. By the use of such filters, an extremely large filter area may be contained in a vessel of small volume. Provisions may also be made for adding a filter-aid precoat for collecting foreign material and prolonging the life of the glass wool. A cylindrical arrangement may also be used in which the emulsion passes from the outside through layers of glass wool compressed between perforated cylinders, into the center of the filter.

Although the invention has been described in detail with regard to preferred procedures and in reference to certain preferred materials and proportions, it is to be understood that variations and modifications therein are possible without departing from the spirit and scope of the invention as defined by the following claims.

We claim:

1. The method of desalting brine-containing oleaginous liquids comprising passing a brine-containing oleaginous liquid through a bed of fiber glass, said bed having a density of from about 10 pounds to about 20 pounds per cubic foot and an interfiber distance, based on such bed densities, of from about 0.0042 inch to about 0.0084 inch.

2. The method of desalting a brine-containing oil comprising passing a brine-containing oil through a bed of fiber glass, said bed having a density of from about 10 pounds to about 20 pounds per cubic foot, an interfiber distance, based on said bed densities, of from about 0.0042 inch to about 0.0084 inch, and an exposed fiber area of from about 2.2 to about 4.4 square foot per gallon of oil treated per hour.

3. The method of desalting a salt-containing oil comprising passing a salt-containing oil successively through beds of fiber glass and beds of gravel said fiber glass having a density of from about 10 pounds to about 20 pounds per cubic foot, an interfiber distance, based on such bed densities, of from about 0.0042 inch to about 0.0084 inch, and an exposed fiber area of from about 2.2 to about 4.4 square foot per gallon of oil treated per hour, and said gravel being from about 4 to about 8 mesh.

4. The method of resolving a crude oil-salt water emulsion and of desalting said crude oil comprising introducing from about 5% to about 10% fresh water into an emulsion of crude oil and salt water, heating said emulsion to a temperature of from about 150° F. to about 300° F., passing said mixture directly through a fiber glass bed having a density of from about 10 pounds to about 20 pounds per cubic foot and an interfiber distance, based on such bed densities, of from about 0.0042 inch to about 0.0084 inch, introducing the filtrate from said filter bed into a settling chamber wherein said oil and said water are permitted to stratify, and separately withdrawing said water and said oil substantially free of salt.

5. The method of desalting crude oil comprising passing a salt-containing crude oil at a temperature of about 200° F. to about 250° F. through a fiber glass bed comprising a plurality of layers of fiber glass having an average diameter within the range of from about 0.0002 to about 0.0003 inch, said fiber glass bed having a total depth of about 5 inches and a density of about 14.2 pounds per cubic foot.

6. The method of desalting a brine-containing crude oil comprising passing a mixture of brine and crude oil through a filter bed of fiber glass consisting of fibers having an average diameter smaller than about 0.00055 inch and compressed to a density in excess of ten pounds per cubic foot, said brine-containing oil being passed through said bed at a rate not exceeding about 1200 barrels per day per cubic foot of compressed fiber glass.

7. The method described in claim 6 in which the crude oil is preheated to a temperature of from about 150° F. to about 300° F.

8. The method described in claim 6 in which from about 5% to about 10% fresh water is added to the brine-containing crude oil.

9. The method described in claim 6 in which the filtrate from the filter bed is settled to permit stratification of the oil and water and separating the salt-free oil from the water.

CHALMER G. KIRKBRIDE.
MARK C. HOPKINS.

REFERENCES CITED

The following references are of record in the file of this patent:

UNITED STATES PATENTS

| Number | Name | Date |
|---|---|---|
| 1,506,115 | Donaldson | Aug. 26, 1924 |
| 1,596,585 | De Groote | Aug. 17, 1926 |
| 1,596,586 | De Groote | Aug. 17, 1926 |
| 1,840,164 | Hirt | Jan. 5, 1932 |
| 2,228,353 | Howes | Jan. 14, 1941 |
| 2,245,551 | Adams et al. | June 17, 1941 |
| 2,355,078 | Johnson | Aug. 8, 1944 |

OTHER REFERENCES

Scientific American, Dec. 11, 1920, vol. 123, page 593; Filtering by Means of Spun Glass.